(12) United States Patent
Rische et al.

(10) Patent No.: US 7,276,554 B2
(45) Date of Patent: *Oct. 2, 2007

(54) COATING MATERIAL COMPOSITION

(75) Inventors: Thorsten Rische, Unna (DE); Torsten Pohl, Köln (DE); Jürgen Meixner, Krefeld (DE); Uwe Klippert, Burscheid (DE); Thomas Feller, Solingen (DE)

(73) Assignee: Bayer MaterialScience AG, Leverkusen (DE)

( * ) Notice: Subject to any disclaimer, the term of this patent is extended or adjusted under 35 U.S.C. 154(b) by 11 days.

This patent is subject to a terminal disclaimer.

(21) Appl. No.: 11/034,137

(22) Filed: Jan. 12, 2005

(65) Prior Publication Data

US 2005/0182188 A1 Aug. 18, 2005

(30) Foreign Application Priority Data

Jan. 16, 2004 (DE) ...................... 10 2004 002 525

(51) Int. Cl.
- C08K 3/00 (2006.01)
- C08G 18/08 (2006.01)
- C08G 18/28 (2006.01)
- C08G 18/12 (2006.01)

(52) U.S. Cl. ...................... 524/591; 524/839; 524/840; 524/589; 428/423.1; 427/372.2; 427/385.5

(58) Field of Classification Search ............... 524/591, 524/839, 840, 589; 428/423.1; 427/385.5, 427/372.2

See application file for complete search history.

(56) References Cited

U.S. PATENT DOCUMENTS

| | | | |
|---|---|---|---|
| 3,415,768 A | 12/1968 | Dieterich et al. | 260/29.2 |
| 3,635,870 A | 1/1972 | Thoma et al. | 260/30.8 |
| 3,640,937 A | 2/1972 | Thoma et al. | 260/30.8 |
| 3,705,164 A | 12/1972 | Honig et al. | 260/29.6 NR |
| 3,920,598 A | 11/1975 | Reiff et al. | 260/29.2 TN |
| 4,108,814 A | 8/1978 | Reiff et al. | 260/29.2 TN |
| 4,147,679 A | 4/1979 | Scriven et al. | 260/29.2 TN |
| 4,237,264 A * | 12/1980 | Noll et al. | 528/67 |
| 4,447,571 A | 5/1984 | Dabi et al. | 524/192 |
| 4,644,030 A | 2/1987 | Loewrigkeit et al. | 524/457 |
| 4,730,021 A | 3/1988 | Zom et al. | 524/457 |
| 4,808,691 A | 2/1989 | König et al. | 528/76 |
| 5,126,393 A | 6/1992 | Blum et al. | 524/538 |
| 5,137,961 A | 8/1992 | Goos et al. | 524/457 |
| 5,137,967 A | 8/1992 | Brown | 524/840 |
| 5,252,696 A | 10/1993 | Laas et al. | 528/49 |
| 5,569,707 A * | 10/1996 | Blum et al. | 524/591 |
| 6,426,414 B1 | 7/2002 | Laas et al. | 544/222 |
| 6,767,958 B2 | 7/2004 | Laas et al. | 524/840 |
| 2003/0194556 A1 | 10/2003 | Rische et al. | 428/406 |
| 2004/0034162 A1 | 2/2004 | Laas et al. | 524/589 |
| 2004/0204559 A1 | 10/2004 | Melchiors et al. | 528/44 |

FOREIGN PATENT DOCUMENTS

| | | |
|---|---|---|
| CA | 2253119 | 5/1999 |
| DE | 1 570 540 | 3/1970 |
| DE | 100 07 821 | 8/2001 |

OTHER PUBLICATIONS

Ullmanns Encyclopädie der technischen Chemie, 4th edition, vol. 19, (date unavailable) pp. 31-38, Dieter Maassen et al, "Polyalkylenglykole".

Methoden der organischen Chemie (Houben-Weyl) 4th edition, vol. E20, M. Bartl and J. Falbe, (month unavailable) 1987, pp. 1671-1682, D. Dieterich, "Poly(urethane)".

Ullmann's Encyclopaedia of Industrial Chemistry, vol. A21 (month unavailable) 1992, pp. 667-682, Dieter Dieterich, "Polyurethanes".

Houben-Weyl: Methoden der Organischen Chemie, vol. E20, (month unavailable) 1987, pp. 1659-1692, D. Dieterich, "Poly(urethane)".

* cited by examiner

Primary Examiner—Kriellion A Sanders
(74) Attorney, Agent, or Firm—Noland J. Cheung; Robert S. Klemz

(57) ABSTRACT

Coating compositions that are stable to thermal yellowing that include coating materials containing I) one or more dispersions of hydroxyl-free polyurethanes and/or polyurethane-ureas, II) one or more aqueous solutions or dispersions of ionically modified, hydroxyl-containing polyurethanes and/or polyurethane-ureas, other than the constituents of component I), and III) at least one crosslinker. The dispersions are obtained by A) preparing an NCO-containing polyurethane prepolymer by reacting polyisocyanates with polymeric polyols and/or polyamines having number-average molecular weights of 400 to 8000 g/mol, isocyanate-reactive, ionically or potentially ionically hydrophilicizing compounds and/or isocyanate-reactive nonionically hydrophilicizing compounds; B) either dissolving the prepolymer obtained from step A) in aliphatic ketones or, diluting the prepolymer solution if the preparation has already been carried out in the presence of A6) by further addition of aliphatic ketones, and C) reacting the remaining free NCO groups of the prepolymer with a chain extender component.

18 Claims, No Drawings

COATING MATERIAL COMPOSITION

CROSS REFERENCE TO RELATED PATENT APPLICATION

The present patent application claims the right of priority under 35 U.S.C. §119 (a)-(d) of German Patent Application No. 10 2004 002 525.8, filed Jan. 16, 2004.

BACKGROUND OF THE INVENTION

1. Field of the Invention

The invention relates to new coating compositions stable to thermal yellowing, and to their preparation and use.

2. Description of the Prior Art

Polyurethane-polyurea dispersions (PU dispersions) and aqueous formulations of PU dispersions are known state of the art. An overview of the various types and processes for preparing PU dispersions and their aqueous formulations is found for example in Houben-Weyl: "Methoden der Organischen Chemie", Vol. E 20, pp. 1659-1692 or in "Ullmann's Encyclopaedia of Industrial Chemistry" (1992) Vol. A21, pp. 667-682. By virtue of their combination of positive properties such as mechanical strength, high adhesion to different substrates, solvent resistance, gloss, etc., they find broad use as, for example, paints and coatings. One important field of use of aqueous formulations of ionically modified PU dispersions is in the area of the painting of plastics parts.

The aesthetic and technical requirements mean that plastics parts are usually painted, in order to protect the plastic against external influences, such as sunlight, chemical, thermal and mechanical stress, to achieve particular colours and colour effects, to mask defects in the plastic's surface or to give it a pleasant feel (tactility). In order to improve the tactile properties of plastics parts, use has been made increasingly in recent years of what are called soft feel coating materials.

"Soft for effect" present invention refers to a particular tactual sensation (tactuality) of the coated surface; this tactility can be described using terms such as velvety, soft, rubbery, warm, whereas, for example, the surface of a painted car body or else an unpainted polymer sheet or one coated with a customary clear coat or top coat material and made, for example, of ABS, Makrolon® (polycarbonate, Bayer AG) or plexiglass (polymethyl methacrylate) feels cold and smooth. In tune with the trend of avoiding solvent emissions to the environment, recent years have seen the establishment of aqueous soft feel coating materials based on the polyurethane chemistry, as disclosed, by way of example, in the teaching of DE 44 06 159. As well as an excellent soft feel effect, these coating materials also produce coatings having good resistance and protection for the plastics substrate. It has since been found, however, that these coating materials and coatings often have only an inadequate yellowing stability.

The object of the present invention is therefore to provide coating materials which in addition to the abovementioned mechanical and tactile properties lead, in comparison to prior art coating materials, to coatings with significantly greater stability to thermal yellowing and/or a significantly lower level of thermal yellowing.

As described for example in DE-A 44 06 159, plastics-coating materials having the desired tactile soft feel properties are composed in part of PU dispersions containing no notable amounts of hydroxy-functional groups.

The prior art has disclosed numerous stabilizers and additives which are able to reduce thermal yellowing of binders. In the field of the above aqueous not notably hydroxyl-functional PU dispersion, however, the inhibitory effect of these systems on yellowing is inadequate or they lead to poorer performance properties of the dispersions and coatings, such as poorer stress-strain behaviour or poor compatibilities with other paint or coating components. The known additives are also prone to migration from the coatings produced, so that, over time, unwanted fogging and a tailing off in the yellowing stabilization comes about.

U.S. Pat. No. 5,137,967 describes the preparation of carboxylate-containing PU dispersions which are stable with respect to thermal yellowing and are prepared by the method known as the prepolymer mixing method. For yellowing stabilization, hydrazine is used to chain-extend the prepolymer and dimethylaminoethanol (DMAE) is used as the neutralizing amine for the carboxylic acid groups.

DE-A 32 38 169 describes a process for preparing PU dispersions which uses hydrazine or hydrazides as additives or as chain extenders. Exclusively anionic, carboxylate-functional PU dispersions by the prepolymer mixing method are described.

Hydrazines and hydrazides as chain extenders in polyurethanes are known in principle, for example, from U.S. Pat. No. 4,147,679 or DE-A 23 14 513. In some cases they are also used in mixtures with other chain extenders such as diamines (U.S. Pat. No. 3,415,768). They serve to improve flexibility, hardness, resistance and drying of the coatings.

SUMMARY OF THE INVENTION

The present invention provides coating materials that include I) one or more dispersions of hydroxyl-free polyurethanes and/or polyurethane-ureas (PU dispersions), II) one or more aqueous solutions or dispersions of ionically modified, hydroxyl-containing polyurethanes and/or polyurethane-ureas, other than the constituents of component I), and III) at least one crosslinker and IV) optionally other film-forming resins. The PU dispersions used in I) are obtained by A) preparing an NCO-containing polyurethane prepolymer by reacting A1) polyisocyanates with A2) polymeric polyols and/or polyamines having number-average molecular weights of 400 to 8000 g/mol, A3) optionally low molecular weight compounds having number-average molecular weights of 17 to 400 g/mol selected from the group consisting of mono- and polyalcohols, mono- and polyamines and also amino alcohols, A4) isocyanate-reactive, ionically or potentially ionically hydrophilicizing compounds and/or A5) isocyanate-reactive nonionically hydrophilicizing compounds A6) optionally in aliphatic ketones as solvents; with the proviso that none of components A1) to A5) contains primary or secondary amino groups, B) either dissolving the prepolymer obtained from step A) in aliphatic ketones or, diluting the prepolymer solution if the preparation has already been carried out in the presence of A6) by further addition of aliphatic ketones, and C) reacting the remaining free NCO groups of the prepolymer with a chain extender component that includes C1) hydrazine and/or hydrazine hydrate and C2) optionally compounds meeting the definition of components A2), A3), A4) and/or A5), with the proviso that the compounds of component C2) contain primary and/or secondary amino groups, the total amounts of C1) and C2) are such that an arithmetic degree of chain extension of 40 to 200% is attained, and the proportion of C1) and C2) is such that at least 40% of the free isocyanate groups are terminated by and/or chain-extended with amino groups from component C1).

The present invention also provides a method of making a coating that includes combining the above-described coating materials with one or more additives selected from defoamers, thickeners, pigments, dispersing assistants, matting agents, catalysts, anti-skinning agents, anti-settling agents, emulsifiers, additives which enhance the soft feel effect, and combinations thereof.

The present invention further provides coatings produced using the above-described coating materials as well as substrates coated with such coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The present invention provides coating materials with significantly greater stability to thermal yellowing and/or a significantly lower level of thermal yellowing.

Thus, it has now been found that coating materials comprising non-functional PU dispersions, prepared by a defined process using hydrazine as chain extender component, fulfil the desired properties without the addition of specific external stabilizers/additives, and without impairing the mechanical and tactile properties called for above in the coating.

The present invention accordingly provides coating materials comprising
I) one or more dispersions of hydroxyl-free polyurethanes and/or polyurethane-ureas (PU dispersions)
II) one or more aqueous solutions or dispersions of ionically modified, hydroxyl-containing polyurethanes and/or polyurethane-ureas, other than the constituents of component I), and
III) at least one crosslinker and
IV) optionally further film-forming resins, characterized in that the PU dispersions used in I) are obtainable by
A) first preparing an NCO-containing polyurethane prepolymer by reacting
   A1) polyisocyanates with
   A2) polymeric polyols and/or polyamines having number-average molecular weights of 400 to 8000 g/mol,
   A3) optionally low molecular weight compounds having number-average molecular weights of 17 to 400 g/mol selected from the group consisting of mono- and polyalcohols, mono- and polyamines and also amino alcohols,
   A4) isocyanate-reactive, ionically or potentially ionically hydrophilicizing compounds and/or
   A5) isocyanate-reactive nonionically hydrophilicizing compounds
   A6) optionally in aliphatic ketones as solvents with the proviso that none of components A1) to A5) contains primary or secondary amino groups,
B) either dissolving the prepolymer obtained from step A) in aliphatic ketones or, if preparation has already been carried out in the presence of A6), diluting the prepolymer solution optionally by further addition of aliphatic ketones, and
C) reacting the remaining free NCO groups of the prepolymer with a chain extender component comprising
   C1) hydrazine and/or hydrazine hydrate and
   C2) optionally compounds meeting the definition of components A2), A3), A4) and/or A5),
   with the proviso that
   the compounds of component C2) contain primary and/or secondary amino groups,
   the total amounts of C1) and C2) are such that an arithmetic degree of chain extension of 40 to 200% is attained and
   the proportion of C1) and C2) is such that at least 40% of the free isocyanate groups are terminated by and/or chain-extended with amino groups from component C1).

Suitable polyisocyanates of component A1) are the aromatic, araliphatic, aliphatic or cycloaliphatic polyisocyanates which are known per se to the skilled person and which may also contain iminooxadiazinedione, isocyanurate, urethione, urethane, allophanate, biuret, urea, oxadiazinetrione, oxazolidinone, acylurea and/or carbodiimide structures. They may be used in A1) individually or in any desired mixtures with one another.

Examples of suitable aromatic, araliphatic, aliphatic or cycloaliphatic polyisocyanates are di- and/or triisocyanates of the molecular weight range 140 to 400 g/mol which are obtainable by phosgenation or by phosgene-free processes, as by thermal urethane cleavage, for example, and which contain aliphatically, cycloaliphatically, araliphatically and/or aromatically attached isocyanate groups, such as 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Bayer AG, Leverkusen), 4-isocyanatomethyl-1,8-octane diisocyanate (triisocyanatononane, TIN), ω,ω'-diisocyanato-1,3-dimethylcyclohexane (H6XDI), 1-isocyanato-1-methyl-3-isocyanatomethylcyclohexane 1-isocyanato-1-methyl-4-isocyanatomethylcyclohexane, bis(isocyanatomethyl) norbornane, 1,5-naphthalene diisocyanate, 1,3- and 1,4-bis(2-isocyanatoprop-2-yl)benzene (TMXDI), 2,4- and 2,6-diisocyanatotoluene (TDI), in particular the 2,4 and the 2,6 isomer and technical-grade mixtures of the two isomers, 2,4'- and 4,4'-diisocyanatodiphenylmethane (MDI), 1,5-diisocyanatonaphthalene, 1,3-bis(isocyanatomethyl)benzene (XDI) and any desired mixtures of the said compounds.

Preference is given to using in A1) polyisocyanates or polyisocyanate mixtures of the aforementioned kind containing exclusively aliphatically and/or cycloaliphatically attached isocyanate groups.

Particular preference is given to hexamethylene diisocyanate, isophorone diisocyanate and the isomeric bis(4,4'-isocyanatocyclohexyl)methanes and also to mixtures thereof.

It is important that for preparing the prepolymer the compounds used in A2) to A5) are only such as contain no primary and/or secondary amino functions. In the context of the chain extension, in contrast, it is possible in C2) to use compounds which meet the definitions of components A2) to A5) but which additionally contain primary and/or secondary amino groups.

Polymeric polyols or polyamines meeting the definition of component A2) come typically from the group consisting of polyacrylates, polyesters, polylactones, polyethers, polycarbonates, polyester carbonates, polyacetals, polyolefins and polysiloxanes and possess preferably one functionality relative to NCO-reactive functionalities of 1.5 to 4.

Particularly preferred polymeric polyols are those of the aforementioned kind having a number-average molecular weight of 600 to 2500 g/mol and having an OH functionality of 2 to 3.

Hydroxyl-containing polycarbonates meeting the definition of component A2) are obtainable by reacting carbonic acid derivatives, e.g. diphenyl carbonate, dimethyl carbonate or phosgene, with diols.

Examples of suitable such diols include ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A or else lactone-modified diols. Preferably the diol component contains 40 to 100% by weight of hexanediol, preferably 1,6-hexanediol and/or hexanediol derivatives, with particular preference derivatives which in addition to terminal OH groups contain ether or ester groups, such as products obtained by reacting 1 mol of hexanediol with at least 1 mol, preferably 1 to 2 mol, of caprolactone as in DE-A 17 70 245 or by etherifying hexanediol with itself to form the di- or trihexylene glycol. The preparation of such derivatives is known, for example, from DE-A 15 70 540. The polyether-polycarbonate diols described in DE-A 37 17 060, as well, can be used.

The hydroxyl polycarbonates are preferably linear, but may also be branched where appropriate as a result of the incorporation of polyfunctional components, especially low molecular weight polyols. Examples of those suitable for this purpose include glycerol, trimethylolpropane, hexane-1,2,6-triol, butane-1,2,4-triol, trimethylolpropane, pentaerythritol, quinitol, mannitol, and sorbitol, methylglycoside, and 1,3,4,6-dianhydrohexitols.

Suitable polyether polyols meeting the definition of component A2) are the polytetramethylene glycol polyethers which are known per se in polyurethane chemistry and can be prepared, for example, via polymerization of tetrahydrofuran by cationic ring opening.

Additionally suitable polyether polyols are polyethers, such as the polyols, prepared using starter molecules, of styrene oxide, propylene oxide, butylene oxides or epichlorohydrin, particularly of propylene oxide.

Examples of suitable polyester polyols meeting the definition of component A2) include reaction products of polyhydric, preferably dihydric and optionally additionally trihydric alcohols with polybasic, preferably dibasic, carboxylic acids. Instead of the free polycarboxylic acids it is also possible to use the corresponding polycarboxylic anhydrides or corresponding polycarboxylic esters of lower alcohols or mixtures thereof to prepare the polyesters. The polycarboxylic acids may be aliphatic, cycloaliphatic, aromatic and/or heterocyclic in nature and may optionally be substituted, by halogen atoms for example, and/or unsaturated.

In the process it is possible to add compounds meeting the definition of component A3) for terminating the polyurethane prepolymer.

Compounds suitable for this purpose are, for example, aliphatic monoalcohols or monoamines of the stated molecular weight range having 1 to 18 carbon atoms, such as ethanol, n-butanol, ethylene glycol monobutyl ether, 2-ethylhexanol, 1-octanol, 1-dodecanol, 1-hexadecanol, diethylamine, dibutylamine, ethanolamine, N-methylethanolamine, N,N-diethanolamine, amines of the Jeffamin® M series (Huntsman Corp. Europe, Belgium) or amino-functional polyethylene oxides and polypropylene oxides.

In addition it is possible to use polyols, amino polyols or polyamines having a number-average molecular weight below 400 g/mol in the process. Those that may be mentioned by way of example include:

a) alkanediols and/or -triols, such as ethanediol, 1,2- and 1,3-propanediol, 1,4- and 2,3-butanediol, 1,5-pentanediol, 1,3-dimethylpropanediol, 1,6-hexanediol, neopentyl glycol, 1,4-cyclohexanedimethanol, 2-methyl-1,3-propanediol, 2-ethyl-2-butylpropanediol, trimethylpentanediol, positionally isomeric diethyloctanediols, 1,2- and 1,4-cyclohexanediol, hydrogenated bisphenol A [2,2-bis(4-hydroxycyclohexyl)propane], (2,2-dimethyl-3-hydroxypropyl) 2,2-dimethyl-3-hydroxypropionate, trimethylolethane, trimethylolpropane or glycerol, b) ether diols, such as diethylene diglycol, triethylene glycol, tetraethylene glycol, dipropylene glycol, tripropylene glycol, 1,3-butylene glycol or hydroquinone dihydroxyethyl ether, c) ester diols of the general formulae (I) and (II),

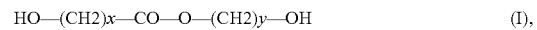

$$HO—(CH_2)_x—CO—O—(CH_2)_y—OH \quad (I),$$

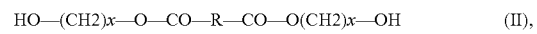

$$HO—(CH_2)_x—O—CO—R—CO—O(CH_2)_x—OH \quad (II),$$

in which
R is an alkylene or arylene radical having 1 to 10 carbon atoms, preferably 2 to 6 carbon atoms,
x is 2 to 6 and
y is 3 to 5,
such as, for example, δ-hydroxybutyl-ε-hydroxy-caproic esters, ω-hydroxyhexyl-γ-hydroxybutyric esters, β-hydroxyethyl adipate and bis(β-hydroxyethyl) terephthalate, and d) di- and polyamines such as 1,2-diaminoethane, 1,3-diaminopropane, 1,6-diaminohexane, 1,3- and 1,4-phenylenediamine, 4,4'-diphenylmethanediamine, isophoronediamine, isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine, 4,4-diaminodicyclohexylmethane, amino-functional polyethylene oxides or polypropylene oxides, which are available under the name Jeffamine®, D series (Huntsman Corp. Europe, Belgium), diethylenetriamine and triethylenetetramine. Further suitable diamines in the sense of the invention include substituted hydrazines, such as N-methylhydrazine, N,N'-dimethylhydrazine and homologues thereof and also acid dihydrazides of adipic acid, β-adipic acid, sebacic acid, hydracrylic acid and terephthalic acid, semicarbazidoalkylene hydrazides, such as β-semicarbazidopropionic hydrazide (e.g. described in DE-A 17 70 591), semicarbazidoalkylene-carbazine esters, such as 2-semi-carbazidoethylcarbazine ester (e.g. described in DE-A 19 18 504) or else aminosemicarbazide compounds, such as β-aminoethylsemicarbazidocarbonate (described in DE-A 19 02 931), for example.

By ionically and potentially ionically hydrophilicizing compounds are meant all compounds which contain at least one isocyanate-reactive group and also at least one functionality, such as —COOY, —SO3Y, —PO(OY)2 (Y for example=H, NH4+, metal cation), —NR2, —NR3+ (R=H, alkyl, aryl), which on interaction with aqueous media enters into an optionally pH-dependent dissociation equilibrium and in that way can have a negative, positive or neutral charge.

Preferred isocyanate-reactive groups are hydroxyl or amino groups.

Suitable ionically or potentially ionically hydrophilicizing compounds meeting the definition of component A4) are, for example, mono- and dihydroxycarboxylic acids, mono- and diaminocarboxylic acids, mono- and dihydroxysulphonic acids, mono- and diaminosulphonic acids and also mono- and dihydroxyphosphonic acids or mono- and diaminophosphonic acids and salts thereof such as dimethylolpropionic acid, dimethylolbutyric acid, hydroxypivalic acid, N-(2-aminoethyl)-β-alanine, 2-(2-aminoethylamino)ethanesulphonic acid, ethylenediaminepropyl- or -butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and the alkali metal and/or ammonium salts thereof; the adduct of sodium bisulphite with but-2-ene-1,4-diol, polyethersulphonate, the propoxylated adduct of 2-butenediol and NaHSO3, described for example in DE-A 2 446 440 (page 5-9, formula I-III), and compounds which contain building blocks which can be converted into cationic groups, amine-based building blocks for example, such as N-methyldiethanolamine, as hydrophilic synthesis components. It is also possible to use cyclohexylaminopropanesulphonic acid (CAPS) such as in WO 01/88006, for example, as a compound meeting the definition of component A4).

Preferred ionic or potential ionic compounds are those which possess carboxyl or carboxylate and/or sulphonate groups and/or ammonium groups.

Particularly preferred ionic compounds are those containing carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP-A 0 916 647, Example 1) and also of dimethylolpropionic acid.

Suitable nonionically hydrophilicizing compounds meeting the definition of component A5) are, for example, polyoxyalkylene ethers containing at least one hydroxyl or amino group. These polyethers include a fraction of 30% to 100% by weight of building blocks derived from ethylene oxide. Those suitable include polyethers of linear construction with a functionality of between 1 and 3, but also compounds of the general formula (III)

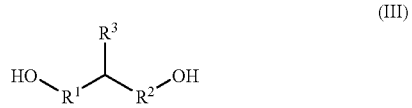

(III)

in which

R1 and R2 independently of one another are each a divalent aliphatic, cycloaliphatic or aromatic radical having 1 to 18 carbon atoms, which may be interrupted by oxygen and/or nitrogen atoms, and R3 is an alkoxy-terminated polyethylene oxide radical.

Nonionically hydrophilicizing compounds also include, for example, monohydric polyalkylene oxide polyether alcohols containing on average 5 to 70, preferably 7 to 55, ethylene oxide units per molecule, such as are obtainable in conventional manner by alkoxylating appropriate starter molecules (e.g. in Ullmanns Encyclopädie der technischen Chemie, 4th edition, Volume 19, Verlag Chemie, Weinheim pp. 31-38).

Examples of suitable starter molecules are saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as diethylene glycol monobutyl ether, for example, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are, in particular, ethylene oxide and propylene oxide, which may be used in any order or else as a mixture in the alkoxylation reaction.

The polyalkylene oxide polyether alcohols are either straight polyethylene oxide polyethers or mixed polyalkylene oxide polyethers at least 30 mol %, preferably at least 40 mol %, of whose alkylene oxide units are composed of ethylene oxide units. Preferred nonionic compounds are monofunctional mixed polyalkylene oxide polyethers containing at least 40 mol % ethylene oxide units and not more than 60 mol % propylene oxide units.

In the process it is preferred to use a combination of ionic and nonionic hydrophilicizing agents meeting the definitions of components A4) and A5). Particularly preferred combinations are those of nonionic and anionic hydrophilicizing agents.

Chain extension in step C) is carried out using hydrazine and/or its hydrates as components C1). Preference is given to using hydrazine monohydrate.

If desired it is also possible in component C2) to use further chain extenders. These meet the above definitions of the compounds suitable for A2)-A5) with the proviso that the compounds used in C2) contain —NH2 and/or NH groups.

In the process it is preferred to use 7 to 45% by weight of component A1), 50 to 91% by weight of component A2), 0 to 30% by weight of compounds A3), 0 to 12% by weight of component A4), 0 to 15% by weight of component A5), 0.1 to 5.0% by weight of C1) (based on pure hydrazine N2H4) and 0 to 15% by weight of C2), the sum of A4) and A5) being 0.1 to 27% by weight and the sum of all the components adding to 100% by weight.

Use is made in particular in the process of 10 to 30% by weight of component A1), 65 to 90% by weight of component A2), 0 to 10% by weight of component A3), 0 to 10% by weight of component A4), 0 to 15% by weight of component A5), 0.1 to 3.0% by weight of C1) (based on pure hydrazine, N2H4) and 0 to 10% by weight of C2), the sum of A4) and A5) being 0.1 to 25% by weight and the sum of all the components adding to 100% by weight.

Very particular preference is given to using in the process 8 to 27% by weight of component A1), 65 to 85% by weight of component A2), 0 to 8% by weight of component A3), 0 to 10% by weight of component A4), 0 to 15% by weight of component A5), 1.0 to 2.5% by weight of C1) (based on pure hydrazine, N2H4) and 0 to 8% by weight of C2), the sum of A4) and A5) being 0.1 to 25% by weight and the sum of the components adding to 100% by weight.

The process for preparing the aqueous PU dispersions can be carried out in one or more stages in homogeneous phase or, in the case of multi-stage reaction, partly in disperse phase. Following complete or partial polyaddition of A1)-A5) there is a dispersing, emulsifying or dissolving step. This is followed optionally by a further polyaddition or modification in disperse phase.

The aqueous PU dispersions can be prepared using the prior art acetone method or modifications thereof. A summary of these methods is given in Methoden der organischen Chemie (Houben-Weyl, Additional and Supplementary Volumes to the 4th Edition, Volume E20, H. Bartl and J. Falbe, Stuttgart, New York, Thieme 1987, pp. 1671-1682). The acetone method is preferred.

Usually in step A) of the process the constituents A2) to A5), which should not contain any primary or secondary amino groups, and the polyisocyanate component A1), for the preparation of a polyurethane prepolymer, are introduced in whole or in part as an initial charge and are diluted optionally with a water-miscible but isocyanato-inert solvent A6) and heated to relatively high temperatures, preferably in the range from 50 to 120° C.

Suitable solvents are the usual aliphatic keto-functional solvents such as acetone or butanone, for example, which can be added not only at the beginning of the preparation but also in portions later on if desired. Acetone and butanone are preferred. It is possible to carry out the reaction under atmospheric pressure or elevated pressure, e.g., above the atmospheric-pressure boiling temperature of a solvent such as, say, acetone.

It is also possible in the process to include the catalysts known to accelerate the isocyanate addition reaction, such as triethylamine, 1,4-diazabicyclo[2.2.2]octane, dibutyltin oxide, tin dioctoate or dibutyltin dilaurate, tin bis(2-ethylhexanoate) or other organometallic compounds, in the initial charge or to meter them in subsequently. Dibutyltin dilaurate is preferred.

Subsequently any constituents from A1)-A5) not added at the beginning of the reaction are metered in.

In the case of the preparation of the polyurethane prepolymer in step A) the molar ratio of isocyanate groups to isocyanate-reactive groups is 1.0 to 3.5, preferably 1.1 to 3.0, more preferably 1.1 to 2.5.

The reaction of components A1)-A5) to the prepolymer is partial or complete, but preferably complete. The degree of reaction is monitored by following the NCO content of the reaction mixture. This can be undertaken using not only spectroscopic measurements, e.g. infrared or near-infrared spectra, but also by determination of the refractive index or by chemical analyses, such as titrations, on samples taken. In this way polyurethane prepolymers containing free isocyanate groups are obtained, as the product per se or in solution.

The preparation of the polyurethane prepolymers from A1) and A2) to A5) is followed or accompanied, if it has not already been carried out in the starting molecules, by partial or complete salt formation from the anionically and/or cationically dispersing groups. In the case of anionic groups this is done using bases such as ammonia, ammonium carbonate or ammonium hydrogencarbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine.

The molar amount of the bases is between 50 and 100%, preferably between 60 and 90% of the molar amount of the anionic groups. In the case of cationic groups, dimethyl sulphate or succinic acid is used. If only nonionically hydrophilicized compounds A5) containing ether groups are used, the neutralization step is omitted. Neutralization may also take place simultaneously with dispersing, with the dispersing water already containing the neutralizing agent.

Subsequently, in a further step B) of the process, if it has not already taken place, or has taken place only partially, in A), the resulting prepolymer is dissolved by means of aliphatic ketones such as acetone or butanone.

In step C) of the process component C1) and also possible NH2- and/or NH-functional components C2) are reacted with the remaining isocyanate groups.

This chain extension/termination may be carried out either in solvent prior to dispersing, in the course of dispersing, or in water after dispersing.

If chain extension in C2) is carried out using compounds meeting the definition of A4) and containing NH2 or NH groups, the prepolymers are chain extended preferably prior to dispersing.

The degree of chain extension, in other words the equivalent ratio of NCO— reactive groups of the compounds used for chain extension in C1) and optionally C2) to free NCO groups of the prepolymer, is usually between 40-200%, preferably between 70-180%, more preferably between 80-160% and very preferably between 101-150%, with C1) being added in an amount such that at least 40%, preferably at least 50% and more preferably at least 70% of the NCO groups have undergone reaction with compounds of component C1).

For the termination of the prepolymer, as well, it is possible in C2) to make use additionally of monoamines such as diethylamine, dibutylamine, ethanolamine, N-methylethanolamine or N,N-diethanolamine, for example.

The aminic components C1) and optionally C2) can optionally be used in water- or solvent-diluted form in the process of the invention, individually or in mixtures, with any order of the addition being possible in principle.

If water or organic solvents are used as diluents then the diluent content is preferably 70 to 95% by weight.

For chain extension it is preferred to add component C1) with the compounds from C2) meeting the definition of A4) and only then to add the compounds from C2) meeting the definitions of A2) and/or A3).

The preparation of the PU dispersions from the prepolymers normally takes place following chain extension (step C). For that purpose the dissolved and chain-extended polyurethane polymer is introduced into the dispersing water with strong shearing if desired, such as strong stirring, for example, or, conversely, the dispersing water is stirred into the prepolymer solutions. It is preferred to add the water to the dissolved prepolymer.

In principle it is possible after the dispersing step to carry out further chain extension by adding additional amounts of C1) and C2), but preferably chain extension is carried out exclusively prior to dispersing.

The solvent still present in the dispersions after the dispersing step is normally then removed by distillation. Removal actually during dispersing is likewise possible.

The dispersions obtained in this way have a solids content of 10 to 70% by weight, preferably 25 to 65% by weight and more preferably 30 to 65% by weight.

Depending on the degree of neutralization and amount of ionic groups it is possible to make the dispersion very fine, so that it almost has the appearance of a solution, although very coarse formulations are also possible, and are likewise sufficiently stable.

Moreover it is possible to modify, using polyacrylates, the aqueous PU dispersions obtainable. For that purpose an emulsion polymerization of olefinically unsaturated monomers, examples being esters of (meth)acrylic acid and alcohols having 1 to 18 carbon atoms, styrene, vinyl esters or butadiene, is carried out in these polyurethane dispersions, as described for example in DE-A 19 53 348, EP-A 0 167 188, EP-A 0 189 945 and EP-A 0 308 115.

Besides one or more olefinic double bonds, these monomers may also contain functional groups such as hydroxyl, epoxy, methylol or acetoacetoxy groups.

The preparation of the constituents of component II) takes place normally such that, first of all, an isocyanate-functional prepolymer is prepared from compounds meeting the definition of components A1) to A5) and in a second reaction step, by reaction with compounds meeting the definition of components A3) and C1), in a non-aqueous medium, an OH- and/or NH-functional polyurethane is obtained, as described for example in EP-A 0 355 682, p. 4, lines 39-45. Alternatively the preparation can take place such that the polyurethane resin containing OH and/or NH groups is formed directly by reacting components A1) to A5) in a non-aqueous medium, as described for example in EP-A 0 427 028, p. 4, line 54-p. 5, line 1.

The compounds meeting the definition of component A2) that are used for synthesizing this prepolymer can, but need not necessarily, be subjected to a distillation step beforehand under reduced pressure. For that purpose these compounds are distilled preferably continuously in a thin-film evaporator at temperatures $\geq 150°$ C., preferably at 170 to 230° C., more preferably at 180 to 220° C., under a reduced pressure of $\leq 10$ mbar, preferably $\leq 2$ mbar, more preferably $\leq 0.5$ mbar. Low molecular weight, non-reactive volatile fractions are separated off under these conditions. In the course of the distillation volatile fractions of from 0.2 to 15% by weight, preferably 0.5 to 10% by weight, more preferably 1 to 6% by weight are separated off.

Prepolymer preparation is normally conducted at temperatures from 0° to 140° C., depending on the reactivity of the isocyanate used. In order to accelerate the urethanization reaction it is possible to use suitable catalysts, such as are known to the skilled person for accelerating the NCO/OH reaction. Examples of such are tertiary amines such as triethylamine or diazobicyclooctane, organotin compounds such as dibutyltin oxide, dibutyltin dilaurate or tin bis(2-ethylhexanoate), for example, or other organometallic compounds.

Prepolymer preparation is preferably conducted in the presence of isocyanate-inert solvents. Particularly suitable for this purpose are solvents which are compatible with water, such as ethers, ketones and esters and also N-methylpyrrolidone. The amount of this solvent advantageously does not exceed 30% by weight and is preferably situated in the range from 10 to 25% by weight, based in each case on the sum of polyurethane resin and solvent.

The acid groups incorporated in the prepolymer obtainable in this way are at least fractionally neutralized. This can be done during or after prepolymer preparation or else during or after dispersing in water, by adding suitable neutralizing agents. Preference for this purpose is given to using tertiary amines such as trialkylamines having 1 to 12, preferably 1 to 6, carbon atoms in each alkyl radical. Examples thereof include trimethylamine, triethylamine, methyldiethylamine, tripropylamine and diisopropylethylamine. The alkyl radicals can, for example, also carry hydroxyl groups, such as in the case of the dialkylmonoalkanolamines, alkyldialkanolamines and trialkanolamines. An example thereof is dimethylethanolamine, which serves preferably as neutralizing agent. As neutralizing agents it is also possible optionally to use inorganic bases, such as ammonia or sodium hydroxide or potassium hydroxide. The neutralizing agent is generally used in a molar ratio with respect to the acid groups of the prepolymer of from about 0.3:1 to 1.3:1, preferably from about 0.4:1 to 1:1.

The neutralizing step is preferably conducted following prepolymer preparation, operating in principle at temperatures from 0 to 80° C., preferably 40 to 80° C.

Thereafter the hydroxy-functional polyurethane is converted into an aqueous dispersion by addition of water or by introduction into water.

The resins of the PU dispersions of component II) that are obtainable in accordance with the procedure described above possess a number-average molecular weight Mn of in general 1000 to 30 000, preferably 1500 to 10 000, an acid number of 10 to 80, preferably 15 to 40 mg KOH/g and an OH content of 0.5 to 5% by weight, preferably 1.0 to 3.5% by weight.

Through combination with suitable crosslinkers of component III) it is possible, in accordance with the reactivity or, where appropriate, blocking of the crosslinkers, to prepare not only one-component coating materials but also two-component coating materials. By one-component coating materials for the purposes of the present invention are meant coating compositions where binder component and crosslinker component can be stored together without a crosslinking reaction taking place to any marked extent or any extent detrimental to the subsequent application. The crosslinking reaction takes place only at the time of application, following activation of the crosslinker. This activation can be brought about by means, for example, of an increase in temperature.

By two-component coating materials for the purposes of the present invention are meant coating compositions where binder component and crosslinker component have to be stored in separate vessels owing to their high reactivity. The two components are only mixed shortly before application, when they react generally without further activation. To accelerate the crosslinking reaction it is also possible, however, to use catalysts or to employ relatively high temperatures.

Examples of suitable crosslinkers include polyisocyanate crosslinkers, amide- and amine-formaldehyde resins, phenolic resins, aldehyde resins and ketone resins, such as phenol-formaldehyde resins, for example, resols, furane resins, urea resins, carbamate resins, triazine resins, melamine resins, benzoguanamine resins, cyanamide resins, aniline resins, as are described in "Lackkunstharze", H. Wagner, H. F. Sarx, Carl Hanser Verlag Munich, 1971.

As crosslinkers of component III) it is preferred to use polyisocyanates having free-isocyanate groups, since the aqueous polyurethane coating materials obtained display a particularly high level of technical coatings properties. Examples of suitable crosslinkers III) include 1-isocyanato-3,3,5-trimethyl-5-isocyanato-methyl-cyclohexane, hexamethylene diisocyanate, 1,4-diisocyanatocyclohexane or bis-(4-isocyanatocyclohexane)methane or 1,3-(bis-2-isocyanatopropyl-2-)-benzene or based on paint polyisocyanates such as polyisocyanates containing uretdione, biuret, isocyanurate or iminooxadiazinedione groups, of hexamethylene diisocyanate, 1-isocyanato-3,3,5-trimethyl-5-isocyanatomethyl cyclohexane or bis-(4-isocyanatocyclohexane)methane, or paint polyisocyanates containing urethane groups and based on 2,4- and/or 2,6-diisocyanatotoluene or 1-isocyanato-3,3,5-trimethyl-5-isocyanatomethyl cyclohexane on the one hand and low molecular weight polyhydroxyl compounds such as trimethylolpropane, the isomeric propane diols or butane diols or any desired mixtures of such polyhydroxyl compounds on the other.

The said compounds containing free isocyanate groups where appropriate may be converted into less reactive derivatives by reaction with blocking agents, these less reactive derivatives then undergoing reaction only following activation, at elevated temperatures, for example. Suitable blocking agents for these polyisocyanates are, for example, monohydric alcohols such as methanol, ethanol, butanol, hexanol, cyclohexanol and benzyl alcohol, oximes such as acetoxime, methyl ethyl ketoxime and cyclohexanone oxime, lactams such as ϵ-caprolactam, phenols, amines such as diisopropylamine or dibutylamine, tert-butylbenzylamine, dimethylpyrazole or triazole, and also dimethyl malonate, diethyl malonate or dibutyl malonate.

Preference is given to the use of low-viscosity, hydrophobic or hydrophilized polyisocyanates of the aforementioned kind containing free-isocyanate groups and based on aliphatic, cycloaliphatic, araliphatic and/or aromatic isocyanates, more preferably aliphatic or cycloaliphatic isocyanates, since in that way it is possible to achieve a particularly high level of resistance in the coating film. These polyisocyanates generally have a viscosity at 23° C. of from 10 to 3500 mPas.

If necessary the polyisocyanates can be employed as a blend with small amounts of inert solvents in order to lower the viscosity to a level within the stated range. Triisocyanatononane as well can be used alone or in mixtures in component III).

The components I) and II) described here are generally sufficiently hydrophilic, so that the dispersibility even of hydrophilic crosslinkers from component III) is ensured. If desired, however, it is also possible to add external emulsifiers such as are known to the skilled person.

Additionally, however, it is possible in component III) to use water-soluble or dispersible, blocked polyisocyanates as are obtainable, for example, by modification with carboxylate, sulphonate and/or polyethylene oxide groups and/or polyethylene oxide/polypropylene oxide groups.

Hydrophilization of the polyisocyanates is possible, for example, through reaction with deficit amounts of monohydric hydrophilic polyether alcohols. The preparation of hydrophilized polyisocyanates of this kind is described for example in EP-A 0 540 985, p. 3 line 55-p. 4 line 5. Also highly suitable are the polyisocyanates containing allophanate groups that are described in EP-A-959087, p. 3, lines 39-51, which are prepared by reacting low-monomer-content polyisocyanates with polyethylene oxide polyether alcohols under allophanatization conditions. Also suitable are the water-dispersible polyisocyanate mixtures based on triisocyanatononane and described in DE-A 100 078 21, p. 2 line 66-p. 3 line 5, and also polyisocyanates hydrophilized with anionic groups (sulphonate groups, phosphonate groups), as described for example in DE 10024624, p. 3 lines 13-33. Hydrophilization through addition of commercially customary emulsifiers is a further possibility.

Also possible in principle, of course, is the use of mixtures of different crosslinker resins of the aforementioned kind in component III).

As further film-forming resins of component IV) suitability is possessed by polymers which are soluble, emulsifiable or dispersible in water and which differ from the constituents of components I) to III). Examples thereof are optionally epoxide-group-containing polyesters, polyurethanes, acrylic polymers, vinyl polymers such as polyvinyl acetate, polyurethane dispersions, polyacrylic dispersions, polyurethane-polyacrylate hybrid dispersions, polyvinyl ether and/or polyvinyl ester dispersions, polystyrene and/or polyacrylonitrile dispersions. The solids content of the film-forming resins for component IV) is preferably 10 to 100% by weight, more preferably 30 to 100% by weight.

The ratio of the crosslinker III) to the compounds of components II) and optionally IV) that are reactive with it is to be chosen such that the ratio of the reactive groups of the crosslinker (NCO groups in the case of isocyanates) to the crosslinker-reactive groups from II) and IV) (OH groups, for example) is from 0.5:1.0 to 3.5:1.0, preferably from 1.0:1.0 to 3.0:1.0 and more preferably from 1.0:1.0 to 2.5:1.0.

The mixture of components I), II) and IV) contains preferably 5 to 95% by weight, more preferably 25 to 75% by weight of component II), the amounts of I) and IV) being chosen such that the total amounts of I), II) and IV) add up to 100% by weight.

As customary coatings auxiliaries and additives the substances known to the skilled person may be present in the coating materials of the invention, such as defoamers, thickeners, pigments, dispersing assistants, matting agents, catalysts, anti-skinning agents, anti-settling agents and/or emulsifiers, and also additives which enhance the desired soft feel effect. The point in time during preparation at which these additives/auxiliaries are added to the coating materials of the invention or incorporated into them is unimportant.

The aqueous coating materials of the invention are suitable for all fields of use in which aqueous paint and coating systems subject to stringent requirements on the surface quality/resistance of the films are employed, such as the coating of surfaces of mineral building materials, the coating and sealing of wood and wood-based materials, the coating of metallic surfaces (metal coating), the coating and painting of asphaltic or bituminous coverings, the coating and sealing of various surfaces of plastics (plastics coating) and also high-gloss varnishes.

They are particularly suitable, however, for producing soft feel effect coating materials which are stable to thermal yellowing and which ensure good solvent resistance and, in particular, good resistance to sun cream (sun tan lotion test). Such coating materials are preferably used in plastics coating or in wood coating, where curing takes place normally at temperatures between room temperature and 130° C. The two-component technology with non-blocked polyisocyanate crosslinkers allows the use of comparatively low curing temperatures within the abovementioned range.

The aqueous coating materials of the invention are usually used in single-coating materials or in the clear coat or top coat film (topmost film) of multi-coat systems. The coating of the invention can be produced by any of a wide variety of spraying methods such as, for example, air-pressure spraying, airless spraying or electrostatic spraying methods, using one-component or, where appropriate, two-component spraying units. The paints and coating materials comprising the binder dispersions of the invention can also be applied, however, by other methods, as for example by brushing, rolling or knife coating.

EXAMPLES

Unless indicated otherwise, all percentages are to be understood as referring to per cent by weight.

Substances and Abbreviations Used

Diaminosulhonate:
NH2—CH2CH2—NH—CH2CH2—SO3Na (45% in water)

Bayhydrol® XP 2429:
Aliphatic hydroxy-functional polyester-polyurethane dispersion with a solids content of 55%, Bayer AG, Leverkusen, DE.

BYK 348:
Wetting agent (BYK-Chemie, Wesel, DE)

Tego-Wet KL 245 (50% in water):
Flow additive (Degussa AG, Essen, DE)

Bayhydur® 3100:
Hydrophilic, aliphatic polyisocyanate based on hexamethylene diisocyanate (HDI) with an isocyanate content of 17.4%; Bayer AG, Leverkusen, DE Bayhydur® VPLS 2306:
Hydrophilic modified, aliphatic polyisocyanate based on hexamethylene diisocyanate (HDI) with an isocyanate content of 8.0%; Bayer AG, Leverkusen, DE Desmodur® XP 2410:
Low-viscosity aliphatic polyisocyanate resin based on hexamethylene diisocyanate with an isocyanate content of 24.0%; Bayer AG, Leverkusen, DE MPA: 1-methoxy-2-propyl Acetate The solids contents were determined in accordance with DIN-EN ISO 3251. NCO contents, unless expressly stated otherwise, were determined volumetrically in accordance with DIN-EN ISO 11909. The yellowing ($b^*$, $\Delta b^*$ values) was determined by means of the CIELAB method (DIN 5033).

Example 1

Comparative Example

Bayhydrol® PR 240 (anionically hydrophilicized PU dispersion with a solids content of 40% and a mean particle size of 100 to 300 nm, Bayer AG, Leverkusen, DE)

Example 2

Comparative Example

Bayhydrol® VP LS 2305 (anionically and nonionically hydrophilicized PU dispersion with a solids content of 40% and a mean particle size of 100 to 300 mm, Bayer AG, Leverkusen, DE)

Example 3

1453.5 g of polyester PE 170 HN (polyester polyol, OH number 66 mg KOH/g, number-average molecular weight 1700 g/mol, Bayer AG, Leverkusen, DE), 64.1 g of polyether LB 25 (monofunctional polyether based on ethylene oxide/propylene oxide with a number-average molecular weight of 2250 g/mol, OH number 25 mg KOH/g, Bayer AG, Leverkusen, DE) and 0.1 g of Desmorapid® Z (dibutyltin dilaurate, Bayer AG, Leverkusen, DE) were heated to 65° C. Subsequently a mixture of 432.3 g of isophorone diisocyanate and 343.9 g of acetone was added over the course of 5 minutes at 65° C. and the mixture was stirred at reflux until the theoretical NCO value was reached. The finished prepolymer was dissolved with 2298.5 g of acetone at 50° C. and then a solution of 40.6 g of hydrazine hydrate, 48.5 g of isophoronediamine and 421.1 g of water was metered in over the course of 10 minutes. Following the addition of 60.1 g of diaminosulphonate over the course of 5 minutes, stirring was continued for 15 minutes and then the batch was dispersed by adding 2608.4 g of water over the course of 10 minutes. Thereafter the solvent was removed by vacuum distillation to give a storage-stable dispersion having a solids content of 41.0%.

Example 4

1530.0 g of polyester PE 170 (polyester polyol, OH number 66 mg KOH/g, number-average molecular weight 1700 g/mol, Bayer AG, Leverkusen, DE), 67.5 g of polyether LB 25 (monofunctional polyether based on ethylene oxide/propylene oxide with a number-average molecular weight of 2250 g/mol, OH number 25 mg KOH/g, Bayer AG, Leverkusen, DE) and 0.1 g of Desmorapid® Z (dibutyltin dilaurate, Bayer AG, Leverkusen, DE) were heated to 65° C. Subsequently a mixture of 537.1 g of Desmodur® W (bis(4,4'-isocyanatocyclohexyl)methane, Bayer AG, Leverkusen, DE) and 355.0 g of acetone was added over the course of 5 minutes at 65° C. and the mixture was stirred at reflux until the theoretical NCO value was reached. The finished prepolymer was dissolved in 1766.0 g of acetone at 50° C. and then a solution of 50.0 g of hydrazine hydrate, 51.0 g of isophoronediamine and 401.3 g of water was metered in over the course of 10 minutes. Following the addition of 63.3 g of diaminosulphonate over the course of 5 minutes, stirring was continued for 15 minutes and then the batch was dispersed by adding 2915.0 g of water over the course of 10 minutes. Thereafter the solvent was removed by vacuum distillation to give a storage-stable dispersion having a solids content of 41.0%.

The compositions of the inventive coating materials are described in Table 1. To prepare the coating materials each of the dispersions from part I (see Table 1) was introduced as initial charge, the additives (part II) were added and the components were stirred together for 30 minutes. This was followed by addition of the crosslinkers (part III). After a stirring-together time of 5 minutes the coating materials were applied by spraying to glass and Makrofol® sheets (Bayer AG, Leverkusen, DE). Following application, the sheets were flashed off at 23° C. for 10 minutes, then dried at 80° C. for 30 minutes and at 60° C. for 16 h. The dry film thickness was 20 µm.

TABLE 1

| | Coating materials | | | | | | | |
|---|---|---|---|---|---|---|---|---|
| Example | 5 (Comparative) | 6 (Comparative) | 7 | 8 | 9 (Comparative) | 10 (Comparative) | 11 | 12 |
| Part I | | | | | | | | |
| Bayhydrol ® XP 2429 | 50 | 50 | 50 | 50 | 50 | 50 | 50 | 50 |
| PU dispersion from Example 1 | 68.8 | — | — | — | 68.8 | — | — | — |
| PU dispersion from Example 2 | — | 68.8 | — | — | — | 68.8 | — | — |
| PU dispersion from Example 3 | — | — | 67.1 | — | — | — | 67.1 | — |
| PU dispersion from Example 4 | — | — | — | 67.1 | — | — | — | 67.1 |
| Part II | | | | | | | | |
| Byk 348 | 0.8 | 0.8 | 0.8 | 0.8 | 0.8 | 0.8 | 0.8 | 0.8 |
| Tego-Wet KL 245 | 0.6 | 0.6 | 0.6 | 0.6 | 0.6 | 0.6 | 0.6 | 0.6 |
| Water, demin. | 84.0 | 84.0 | 85.6 | 85.6 | 85.5 | 85.5 | 87.1 | 87.1 |
| Part III | | | | | | | | |
| B'dur 3100; 75% in MPA | 11.4 | 11.4 | 11.4 | 11.4 | — | — | — | — |
| B'dur VP LS 2360/ D'dur XP 2410; 75% in MPA | — | — | — | — | 12.4 | 12.4 | 12.4 | 12.4 |
| Total | 215.6 | 215.6 | 215.5 | 215.5 | 218.1 | 218.1 | 218.0 | 218.0 |

The coated and dried sheets were then subjected to thermal loading at 90° C. and 120° C. and the changes in yellowing were monitored over time by means of CIELAB measurements (see Tables 2 to 5).

TABLE 2

Yellowing values at 90° C. storage on glass

| Glass Example | Film thickness [μm] | 0 h $b^*$ | 500 h $\Delta b^*$ | 1000 h $\Delta b^*$ | 1500 h $\Delta b^*$ | 2000 h $\Delta b^*$ | 2500 h $\Delta b^*$ |
|---|---|---|---|---|---|---|---|
| 5 (Comparative) | 20 | 1.83 | 0.96 | 1.27 | 1.55 | 1.76 | 1.90 |
| 6 (Comparative) | 20 | 1.80 | 0.79 | 1.24 | 1.34 | 1.57 | 1.77 |
| 7 | 20 | 1.72 | 0.82 | 0.90 | 1.15 | 1.36 | 1.45 |
| 8 | 20 | 1.79 | 0.82 | 0.93 | 1.04 | 1.39 | 1.41 |
| 9 (Comparative) | 20 | 1.79 | 1.09 | 1.41 | 1.66 | 1.88 | 2.03 |
| 10 (Comparative) | 20 | 1.71 | 0.87 | 1.45 | 1.61 | 1.98 | 2.18 |
| 11 | 20 | 1.76 | 0.75 | 0.99 | 1.09 | 1.23 | 1.26 |
| 12 | 20 | 1.74 | 0.82 | 1.14 | 1.20 | 1.64 | 1.62 |

TABLE 3

Yellowing values at 90° C. storage on Makrofol ®

| Makrofol ® Example | Film thickness [μm] | 0 h $b^*$ | 500 h $\Delta b^*$ | 1000 h $\Delta b^*$ | 1500 h $\Delta b^*$ | 2000 h $\Delta b^*$ | 2500 h $\Delta b^*$ |
|---|---|---|---|---|---|---|---|
| 5 (Comparative) | 20 | 1.51 | 0.89 | 1.37 | 1.48 | 1.55 | 1.78 |
| 6 (Comparative) | 20 | 1.58 | 0.56 | 1.15 | 1.33 | 1.61 | 1.77 |
| 7 | 20 | 1.58 | 0.43 | 1.19 | 0.98 | 1.06 | 1.52 |
| 8 | 20 | 1.49 | 0.55 | 0.96 | 0.80 | 1.13 | 1.30 |
| 9 (Comparative) | 20 | 1.54 | 0.66 | 1.33 | 1.19 | 1.55 | 1.71 |
| 10 (Comparative) | 20 | 1.50 | 0.61 | 1.16 | 1.07 | 1.51 | 1.69 |
| 11 | 20 | 1.57 | 0.49 | 0.96 | 0.91 | 1.18 | 1.16 |
| 12 | 20 | 1.46 | 0.76 | 1.07 | 1.08 | 1.42 | 1.49 |

TABLE 4

Yellowing values at 120° C. storage on glass

| Glass Example | Film thickness [μm] | 0 h b* | 100 h Δ b* | 250 h Δ b* | 500 h Δ b* |
|---|---|---|---|---|---|
| 5 (Comparative) | 20 | 1.83 | 1.87 | 3.23 | 4.58 |
| 6 (Comparative) | 20 | 1.80 | 1.41 | 2.93 | 4.73 |
| 7 | 20 | 1.72 | 0.75 | 1.38 | 2.62 |
| 8 | 20 | 1.79 | 0.78 | 1.99 | 3.35 |
| 9 (Comparative) | 20 | 1.79 | 2.11 | 3.87 | 5.30 |
| 10 (Comparative) | 20 | 1.71 | 2.53 | 4.69 | 6.61 |
| 11 | 20 | 1.76 | 0.68 | 1.69 | 2.87 |
| 12 | 20 | 1.74 | 0.63 | 2.01 | 3.46 |

TABLE 5

Yellowing values at 120° C. storage on Makrofol ®

| Makrofol Example | Film thickness [μm] | 0 h b* | 100 h Δ b* | 250 h Δ b* | 500 h Δ b* |
|---|---|---|---|---|---|
| 5 (Comparative) | 20 | 1.51 | 1.22 | 1.97 | 2.70 |
| 6 (Comparative) | 20 | 1.58 | 0.59 | 1.20 | 2.05 |
| 7 | 20 | 1.58 | 0.35 | 0.87 | 1.65 |
| 8 | 20 | 1.49 | 0.41 | 0.91 | 1.83 |
| 9 (Comparative) | 20 | 1.54 | 2.01 | 2.33 | 3.74 |
| 10 (Comparative) | 20 | 1.50 | 0.84 | 1.73 | 2.76 |
| 11 | 20 | 1.57 | 0.46 | 0.83 | 1.68 |
| 12 | 20 | 1.46 | 0.79 | 1.35 | 2.40 |

The yellowing values demonstrate that the inventive coating materials (Examples 7, 8, 11 and 12) in comparison to the prior art systems (Examples 5, 6, 9 and 10) exhibit significantly lower yellowing values after thermal exposure both on glass and on plastic (Makrofol®, Bayer AG, Leverkusen, DE).

The inventive coating materials from Examples 7, 8, 11 and 12 possess, moreover, mechanical and tactile properties comparable with those of the prior art examples (Examples 5, 6, 9 and 10).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Coating materials comprising
   I) one or more dispersions of hydroxyl-free polyurethanes and/or polyurethane-ureas (PU dispersions)
   II) one or more aqueous solutions or dispersions of ionically modified, hydroxyl-containing polyurethanes and/or polyurethane-ureas, other than the constituents of component I), and
   III) at least one crosslinker and
   IV) optionally other film-forming resins, wherein the PU dispersions used in I) are obtained by
   A) preparing an NCO-containing polyurethane prepolymer by reacting
      A1) polyisocyanates with
      A2) polymeric polyols and/or polyamines having number average molecular weights of 400 to 8000 g/mol,
      A3) optionally low molecular weight compounds having number-average molecular weights of 17 to 400 g/mol selected from the group consisting of mono- and polyalcohols, mono- and polyamines and also amino alcohols,
      A4) optionally isocyanate-reactive, ionically or potentially ionically hydrophilicizing compounds and/or
      A5) optionally isocyanate-reactive nonionically hydrophilicizing compounds
      A6) optionally in aliphatic ketones as solvents with the proviso that none of components A1) to A5) contains primary or secondary amino groups,
   B) either dissolving the prepolymer obtained from step A) in aliphatic ketones or, diluting the prepolymer solution if the preparation has already been carried out in the presence of A6) by further addition of aliphatic ketones, and
   C) reacting the remaining free NCO groups of the prepolymer with a chain extender component comprising
      C1) hydrazine and/or hydrazine hydrate and
      C2) optionally compounds meeting the definition of components A2), A3), A4) and/or A5),
   with the proviso that
      the compounds of component C2) contain primary and/or secondary amino groups,
      the total amounts of C1) and C2) are such that an arithmetic degree of chain extension of 101 to 150% is attained and
      the proportion of C1) and C2) is such that at least 40% of the free isocyanate groups are terminated by and/or chain-extended with amino groups from component C1)
      at least one of A4) and A5) is utilized to prepare the NCO-containing polyurethane prepolymer A.

2. The coating materials according to claim 1, wherein the PU dispersions prepared in step B) and optionally step A) use acetone or butanone as solvent.

3. The coating materials according to claim 1, wherein the PU dispersions comprise the reaction product of 8 to 27% by weight of component A1), 65 to 85% by weight of component A2), 0 to 8% by weight of component A3), 0 to 10% by weight of component A4), 0 to 15% by weight of component A5), 1.0 to 2.5% by weight of C1) (based on pure hydrazine, N2H4) and 0 to 8% by weight of C2) in steps A) to C), the sum of A4) and A5) being 0.1 to 25% by weight and the sum of the components adding to 100% by weight.

4. The coating materials according to claim 1, wherein polyisocyanates are used as crosslinkers in III).

5. The coating materials according to claim 4, wherein the ratio of NCO groups of component III) to the OH groups of components II) and IV) is from 1.0:1.0 to 2.5:1.0.

6. The coating materials according to claim 1, wherein the mixture of components I), II) and IV) contains 25 to 75% by weight of component II) and the amounts of I) and IV) are chosen such that the total amounts of I), II) and IV) add up to 100% by weight.

7. A method of making a coating comprising combining the coating materials according to claim 1 with one or more additives selected from the group consisting of defoamers, thickeners, pigments, dispersing assistants, matting agents, catalysts, anti-skinning agents, anti-settling agents, emulsifiers, additives which enhance the soft feel effect, and combinations thereof.

8. Coatings produced using coating materials according to claim 1.

9. Substrates coated with coatings according to claim 8.

10. The coating materials according to claim 2, wherein the PU dispersions comprise the reaction product of 8 to 27% by weight of component A1), 65 to 85% by weight of component A2), 0 to 8% by weight of component A3), 0 to 10% by weight of component A4), 0 to 15% by weight of component A5), 1.0 to 2.5% by weight of C1) (based on pure hydrazine, N2H4) and 0 to 8% by weight of C2) in steps A) to C), the sum of A4) and A5) being 0.1 to 25% by weight and the sum of the components adding to 100% by weight.

11. The coating materials according to claim 2, wherein polyisocyanates are used as crosslinkers in III).

12. The coating materials according to claim 11, wherein the ratio of NCO groups of component III) to the OH groups of components II) and IV) is from 1.0:1.0 to 2.5:1.0.

13. Coatings produced using coating materials according to claim 2.

14. Substrates coated with coatings according to claim 1.

15. The coating materials according to claim 3, wherein polyisocyanates are used as crosslinkers in III).

16. The coating materials according to claim 15, wherein the ratio of NCO groups of component III) to the OH groups of components II) and IV) is from 1.0:1.0 to 2.5:1.0.

17. Coatings produced using coating materials according to claim 3.

18. Substrates coated with coatings according to claim 17.

* * * * *